Patented May 7, 1929.

1,711,544

UNITED STATES PATENT OFFICE.

JUNJIRO SATO AND TSUNAJI SATO, OF JACKSON, MICHIGAN.

COMPOSITION OF MATTER FOR BATTERY BOXES.

No Drawing.   Application filed September 8, 1927. Serial No. 218,357.

The present invention pertains to a novel composition of matter especially adapted for use in the manufacture of storage battery cases or boxes and has reference more particularly to the use of materials known as gilsonite, Korite, Parolite, elaterite, which are hydro-carbon binders, combined with silex or silica, and a fibrous material, such as asbestos or asbestos fiber.

A box manufactured according to our invention is found to be more satisfactory in service, to have a longer life, and to cost less to manufacture than a battery box made of rubber composition or asbestos according to present methods of manufacture.

The object of the invention is therefore to provide a chemical combination of ingredients which is more satisfactory than the rubber or asphalt boxes now in use. Such a box has considerable strength owing to the intimate binding relation between the hydrocarbons and the fibrous material.

The invention will now be more specifically described with reference to actual examples:

*Example 1.*

15 parts gilsonite.
5 parts Korite.
5 parts Parolite.

These substances are melted in three different iron vessels under considerable heat. When freely melted, they are mixed together, and to this mixture we add 1 part powdered elaterite.
23 parts silex or fine pure silica.
27 parts asbestos or asbestos fiber.

The whole mixture is now mixed well while being heated at a high temperature. It is next put into a high grade steel mold having a polished inner surface covered with softsoap, and the mixture is pressed to proper shape by hydraulic presses in the usual manner.

In connection with the mold, it has been found that when the mold is prepared as above described, the product is imparted a smooth and polished surface.

*Example 2.*

Gilsonite, 25 per cent.
Korite, 24 per cent.
Elaterite, 1 per cent.
Heat and mix as above and add,
Silex 23 per cent.
Asbestos 27 per cent.

Korite and Parolite are blown asphalts having a brownish color (see Abraham's "Asphalts and Allied Substances," 2d edition—corrected,—page 289). Elaterite is a somewhat similar substance but is black and has a high melting point. In so far as an operative composition is concerned, with respect to the hydro-carbon binders, elaterite and only one of the three others are essential, the elaterite being necessary to produce the desired black color and to raise the melting point. The body of the composition is completed by the addition of asbestos and silex or silica.

Although specific embodiments of the invention have been described it will be understood that we may depart from the exact quantities given in the examples within the scope of the invention as indicated by the appended claims.

What we claim is:

1. A battery box made of a mixture of powdered elaterite; gilsonite; a blown asphalt; silex and asbestos.

2. A battery box made of a mixture of 1 per cent powdered elaterite; 49 per cent gilsonite and a blown asphalt; 23 per cent silex and 27 per cent asbestos.

In testimony whereof we affix our signatures.

JUNJIRO SATO.
TSUNAJI SATO.